Figure 1:
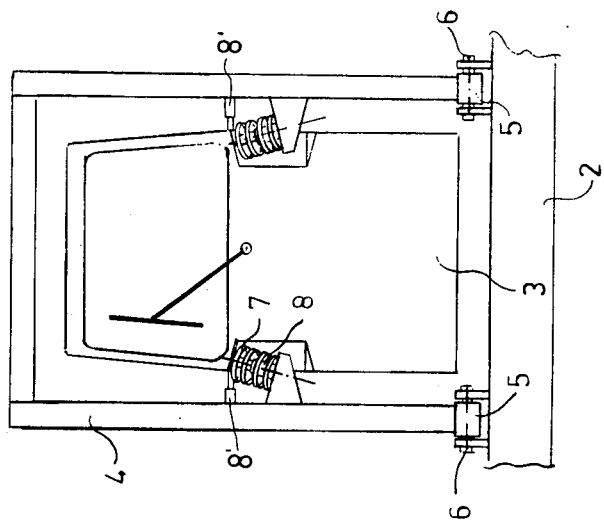

United States Patent [19]

Rowa et al.

[11] 4,265,328

[45] May 5, 1981

[54] DEVICE FOR RESILIENTLY SUPPORTING A DRIVER'S COMPARTMENT, PARTICULARLY IN HEAVY-DUTY TRUCKS

[76] Inventors: Jan-Erik Rowa, Mangigatan 14, 981 00 Kiruna; Anders Sundgren, Tunastigen 82, 951 58 Luleå, both of Sweden

[21] Appl. No.: 31,240

[22] Filed: Apr. 18, 1979

[51] Int. Cl.³ .............................................. B62D 27/04
[52] U.S. Cl. .................................... 180/89.13; 296/190
[58] Field of Search .................... 180/89.3, 35.1, 35.2, 180/89.13; 248/624; 296/190

[56] References Cited

U.S. PATENT DOCUMENTS

| 1,476,674 | 12/1923 | Headley | 248/624 X |
| 1,711,085 | 4/1929 | D'Arcy | 248/624 X |
| 2,892,482 | 6/1959 | Beoletto | 248/624 X |
| 3,958,659 | 5/1976 | Selman | 296/190 |
| 4,012,071 | 3/1977 | Jones et al. | 296/35.1 |
| 4,193,629 | 3/1980 | Merkle | 296/190 |

FOREIGN PATENT DOCUMENTS

| 540714 | 12/1931 | Fed. Rep. of Germany | 248/624 |
| 2601087 | 7/1976 | Fed. Rep. of Germany | 296/190 |
| 1555946 | 4/1978 | Fed. Rep. of Germany | 296/190 |

Primary Examiner—Randolph A. Reese
Assistant Examiner—Norman L. Stack, Jr.
Attorney, Agent, or Firm—Pollock, Vande Sande and Priddy

[57] ABSTRACT

A device for resiliently supporting a driver's compartment subjected to vibrations in heavy-duty trucks having a non-resilient wheel suspension, said compartment housing at least one seat and being connected to a supporting portion of the vehicle by three or more spring structure, spaced circumferentially around the compartment, the point of connection of said spring structure with the compartment being disposed in a common and substantially horizontal plane located closely adjacent the center of gravity of said compartment. The axis of action of said spring structures forms an acute angle with a vertical axis so as to allow the accomodation of vibrations in all directions in a three-axis right-angle coordinate system, i.e. to obtain all six degrees of freedom of movement.

4 Claims, 2 Drawing Figures

DEVICE FOR RESILIENTLY SUPPORTING A DRIVER'S COMPARTMENT, PARTICULARLY IN HEAVY-DUTY TRUCKS

The present invention relates to a device for resiliently supporting a driver's compartment which is subjected to vibrations in heavy duty trucks and contractor's vehicles or the like having non-resilient wheel suspensions, said compartment housing at least one chair or other seat and which is connected to a supporting portion of the vehicle by at least three spring means which are spaced circumferentially around the compartment, the point of connection of said spring means with the compartment being disposed in a common and substantially horizontal plane located closely adjacent the center of gravity of said compartment.

There has long been an effort to improve the comfort and working environment of drivers of heavy-duty transport and contractor's vehicles, particularly vehicles which are driven off-road or on very rough roads such as in mines, stone-pits or the like, so that the shocks and vibrations, to which the vehicle is subjected when in operation, will have as small an influence as possible on the driver and his operational ability. In such vehicles it has for a number of reasons, turned out to be insufficient to simply increase the padding in the driver's seat itself or to resiliently support the seat in a suitable way, and more extensive measures are required.

One way to achieve improved comfort for the driver has been to make the wheel suspensions of the vehicle resilient or spring-equipped, but in heavier vehicles which for instance can be loaded with more than their own weight, the differences between the resiliency conditions in the loaded and unloaded state, respectively, of the vehicle will be so great that no compromise really perfect to the driver can be obtained. Furthermore, such resilient wheel suspensions can substantially accommodate only vibrations in vertical directions and the structural solutions thereof hitherto presented have turned out to be expensive and complicated wherefore such structures suggested heretofore have been sensitive to vibrations and liable to malfunctions with accompanying downtimes.

As mentioned, improving the resilient suspension of the driver's seat itself has turned out to be impractical primarily due to the fact that the natural frequency of the seat with the driver thereon tends to be too high because of the small total weight of the resilient system. The latter ought to have a natural frequency, namely, of about 1 Hz since the natural frequency of the vehicle and thus the disturbing or interfering frequency is about 2.5–6 Hz and a differential between said natural frequencies of about 2.5 times is required for good isolation. In order to obtain such a low natural frequency the driver's seat must be equipped with spring means which are so weak that the amplitude becomes too great whereby, for example, the driver will meet difficulties in always keeping control of all his controls. Moreover, a resilient suspension of the driver's seat also is suited mainly for accomodating only vertical vibrations.

Another feasible way to provide a good resilient suspension of the driver's location is to make the driver's compartment itself resiliently supported relative the rest of the vehicle. A prior suggestion of such a resilient suspension in vehicles with non-resilient wheel suspensions is described in U.S. Pat. No. 3,420,568 issued Jan. 16, 1969, for "Devices For Resilient Support of Driver's Compartments In Vehicles". The structure disclosed therein has turned out to be able to accomodate very well vertical vibrations, but as the research of the working environment field goes further and vehicles are given further increased dimensions, vibrations longitudinally of the vehicles and particularly transverse thereto has turned out to have the same or even greater detrimental influence on the operational ability of a driver. Therefore there is an ever-increasing need for a driver's compartment suspension which, in addition to vertical vibrations, can also accomodate to a required extent vibrations in the longitudinal and transverse directions as well as engine vibrations.

The main object of the present invention therefore is to provide such an improved driver's compartment suspension. The present invention is substantially distinguished from suggestions made in the past in that the axis of action of the spring means used in the compartment suspension forms an acute angle with a vertical axis so as to allow the accomodation of vibrations or vibratory motions in all directions in a three axis right-angle coordinate system, i.e. to obtain six degrees of freedom of movement.

Since the spring means according to the present invention are connected with the compartment in a plane adjacent the center of gravity thereof and thus at the middle of the longitudinal extension of a person sitting in the compartment, where the center of motion of the same will be located, the motion amplitudes of said person will be minimized and a resilient suspension is achieved which provides the dirver with great comfort. The location of the spring means also makes it possible for them to accomodate, with a suitably directed axis of action, motions to any desired extent not only vertically but also longitudinally and transverse, which has been impossible with structures suggested heretofore.

Figure 2:
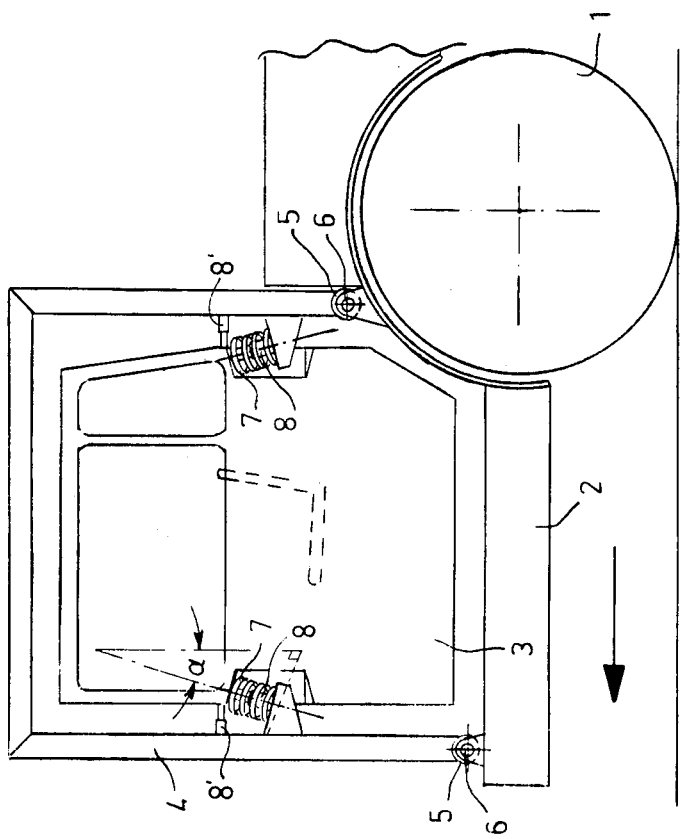

By way of example the present invention will be further described below with reference to the accompanying drawings, in which FIG. 1 is a diagrammatical side elevational view of a resiliently suspended driver's compartment according to the invention and FIG. 2 is a diagrammatic front view of the same compartment.

In the drawings there is illustrated, as an example, the front end of a heavy-duty transport vehicle having non-resiliently suspended front wheels 1 and a frame portion 2 protruding in front thereof, on which frame portion is resiliently suspended a driver's compartment 3 with a driver's seat mounted therein. Since the driver's location from a protectional point of view has to fill certain requirements, either the compartment 3 itself can be made with sufficient strength for that purpose, or it can be surrounded, such as in the embodiment illustrated, by a suitably dimensioned frame-like protecting cage 4. At each of its lower corners said cage 4 is preferably secured to the frame portion 2 by means of a high frequency isolating articulation or pivot 5, i.e. a shock-absorbing pivot 5, through which extends a pivot pin 6, secured to brackets on the frame portion 2.

The driver's compartment 3 can have any desired shaped but has been illustrated in the drawings as having a rectangular contour in a plan view. For resilient suspension of the compartment 3 the same is supported from the frame portion 2 through the agency of spring means 7. Said spring means 7 are circumferentially spaced around the periphery of the compartment 3, preferably symmetrically, and are at least three in number. In the illustrated embodiment the number of spring means 7 employed is four, however, placed respectively at the four corners of said compartment 3. According to the invention said four spring means 7 are arranged with their mounting points relative to the compartment 3 being located in a common plane which lies adjacent the center of gravity of said compartment 3 or even passes through said center of gravity. In the drawing, said common plane is horizontal, but for space or other reasons the same also can be arranged somewhat inclined in a suitable manner.

A self-evident precondition for a good resilient action of the compartment 3 is of course that the latter is not interferred by the transmissions from the various controls between the movable compartment 3 and the other portions of the vehicle connected to the frame. Therefore, said transmissions have to be made entirely flexible and free of moments as far as possible.

For accomodating vibrations not only in vertical direction, i.e. along the z-axis of a right-angle coordinate system in the center of gravity of the compartment but also in the longitudinal and transverse direction of the vehicle, i.e. along the x- and y-, the line or axis of action of each spring means 7 is inclined at an acute angle $\alpha$ to the vertical, said angle $\alpha$ being selected to be about 20° in the example illustrated.

Preferably, each spring means 7 consist of an helically coiled compression spring but it will be obvious to those skilled in the art that other kinds of spring means can also be utilized so long as their line of action can be arranged in a similar manner and required values of the spring coefficients in the various coordinate axis directions can be obtained, particularly the transverse spring coefficients. Instead of arranging one single helically coiled compression spring in a suitable inclined position for obtaining the required line of action, each spring means can be composed of several spring means, for instance one substantially horizontal and one substantially vertical helically coiled compression spring, said spring means being mounted on the compartment 3 at substantially the same position and having such a dimensioning that the composite spring means obtains the intended resultant axis of action.

As mentioned earlier, the natural frequency $\omega_n$ of the resilient system, in which the compartment 3 is included, has to be small and equal to about 1 Hz and as a consequence the spring means 7 must be very soft but still exhibit required high transverse spring coefficient. In a typical example of a driver's compartment suspension according to the invention, each spring means 7 is constituted by a helically coiled compression spring having awire diameter of 15 mm and a winding diameter of 150 mm, which has been wound to 10 loops or turns and has a length of 325 mm in its unloaded condition and a length of 250 mm in its loaded condition.

Such a soft spring characteristic requires, however, a good dampening which must be hard and this is obtained in the invention by damping means 8, which for instance can be of conventional telescopic automotive shock-absorber type and primarily built into the spring means 7 as illustrated in the drawings.

For greater movements in x and y direction, i.e. longitudinally and transversely, an amplified damping action may be required in some cases, which can be obtained by mounting a further damping means 8', for instance such as illustrated in the drawings. Said further damping means 8' must be pivotally connectted to the vehicle frame and the compartment, respectively, at their mounting positions so that they do not cause any bending moments which can interfere with the spring movements of the compartment. If desired, the damping means/shock-absorbers can be made adjustable, preferably remotely, by controlling the same by means of pressurized air or the like.

It is also obvious to those skilled in the art that the invention can be modified over the afore-mentioned exemplifying embodiment within the scope of the definition thereof as stated in the accompanying claims. Thus, it is a fully possible but perhaps a less efficient alternative to design the spring means 7 as tensile springs so that at their upper ends they are secured to the frame members of the protecting cage 4 while at their lower ends they are connected to the compartment 3.

A person sitting in the resiliently suspended compartment according to the invention will be located with the center of his longitudinal elongation and thus his center of motion in or adjacent to the center of gravity of the compartment. As a result, the movement amplitudes in all directions will be minimized and the driver will find the resilient suspension of the compartment to be comfortable. Should it be desirable to provide for a certain co-inclination (or even a counter-inclination) of the compartment 3 when travelling e.g. in road turns the plane of the securing points of the spring means can be located at a predetermined distance above or below the center of gravity of the compartment 3 so as to provide for a certain directional action.

An essential advantage of concentrating the spring suspension of the driver's location to only the compartment and not to a combination of the driver's seat and resilient wheel suspension is that the compartment has almost constant weight since the weight of the driver sitting therein might vary with about ±20 kg. This makes it possible to provide a resilient suspension which is relatively simple to calculate and which operates satisfactorily in all operational conditions of the vehicle.

We claim:

1. In a device for resiliently supporting a driver's compartment which is subjected to vibrations in a heavy-duty vehicle having a nonresilient wheel suspension, said compartment housing at least one seat and being connected to a supporting portion of the vehicle by means of a plurality of spring means, the improvement wherein said spring means comprise four helically coiled springs which are spaced from one another symmetrically around the compartment, each of said helically coiled springs being connected to the compartment at a common and substantially horizontal plane which is located intermediate the top and bottom of said compartment at a position closely adjacent the center of gravity of said compartment, the axis of action of each of said helically coiled springs being at an acute angle of about 20° to the vertical so as to allow the accommodation of vibratory motions in all directions in a three-axis right-angle coordinate system, thereby to obtain all six degrees of freedom of movement.

2. A device according to claim 1 wherein the driver's compartment, in a top plan view has a square-cross-sectional shape, the springs being located at the four corners of said compartment.

3. A device according to one of claims 1 or 2, wherein the natural frequency of the driver's compartment and the said springs supporting said compartment is about 1 Hz, and each spring includes at least one damping means.

4. A device according to claim 3, wherein each spring consists of a single helically coiled compression spring whose upper end is secured to the compartment, each said spring being inclined upwardly-inwardly at said angle to the vertical.

* * * * *